Patented May 28, 1940

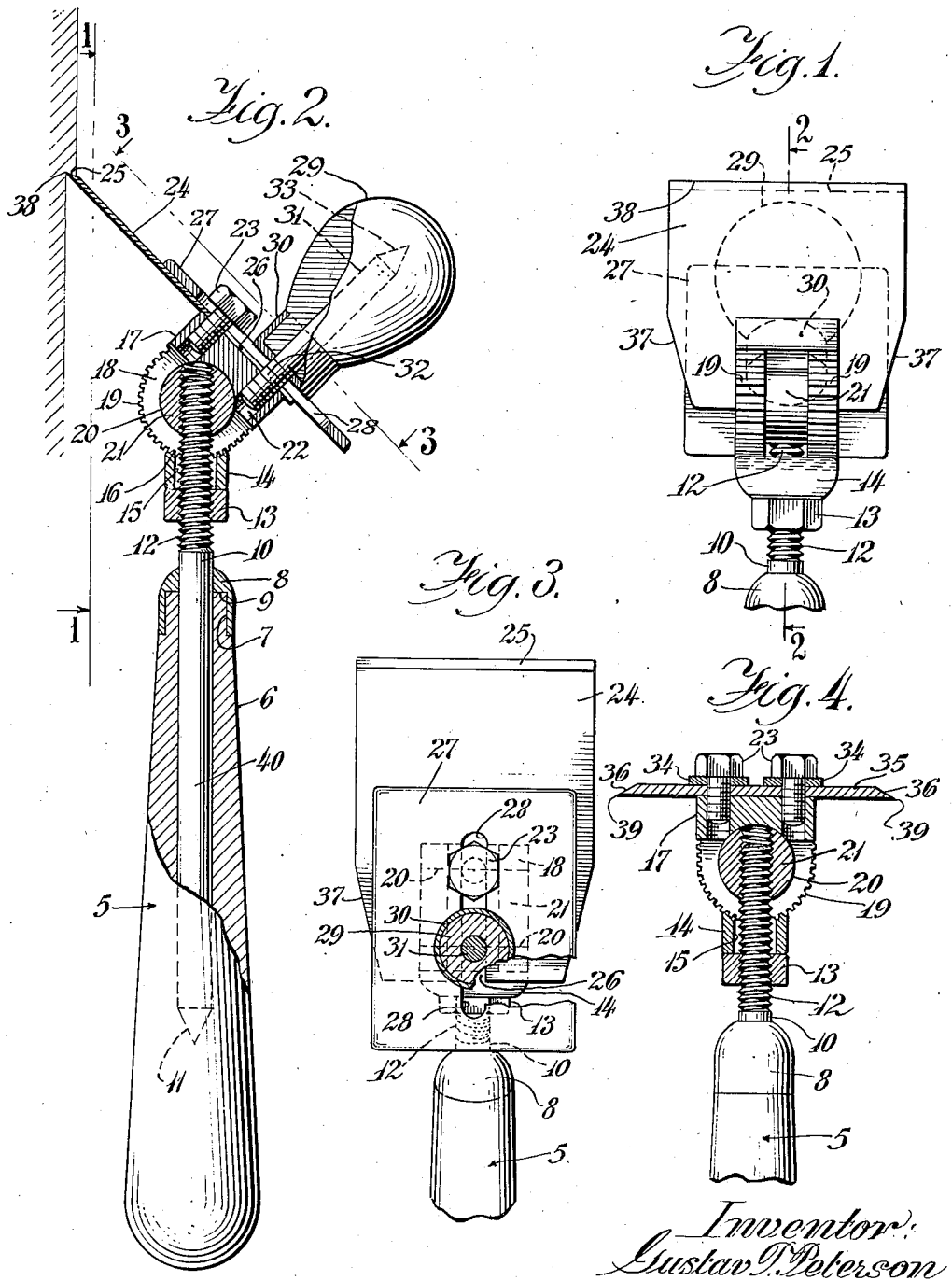

2,202,264

UNITED STATES PATENT OFFICE 2,202,264

SCRAPER

Gustav T. Peterson, Chicago, Ill.

Application September 26, 1938, Serial No. 231,704

1 Claim. (Cl. 30—169)

This invention relates to scrapers, and has for its primary object the provision of a scraper which may be held in both hands of the operator in order to provide more effectively, the pressure required for the scraping action.

Another object of the invention is to provide a flexible blade scraper, the blade being adapted to be adjustable for different ranges of flexibility.

A still further object of the invention is the provision of an adjustable handle member making it further adaptable for angular adjustment which will most conveniently and effectively aid the operator in performing the scraping action.

Another object of the invention is to provide a double edged scraping blade, the operator to have available for use an added sharp edge when one edge becomes dull.

Another object of my invention is to provide a simple, practical, useful scraping tool which is also economical to manufacture in quantity production.

Other features and objects of the invention will become apparent from the ensuing description as related to the drawing herein submitted, wherein like symbols designate like parts and in which:

Fig. 1 represents a side view partially in section, looking in the direction 1—1 of Figure 2.

Fig. 2 represents a longitudinal cross-sectional view on the line 2—2 of Figure 1.

Fig. 3 represents a view looking in the direction 3—3 of Figure 2 with some of the members broken away in order to show the structure more clearly.

Fig. 4 represents a longitudinal cross-sectional view of a modification of my invention, wherein a double edge scraper blade is used.

Referring to the drawing the scraper instrument is generally designated by the numeral 5 and consists of a handle designated by the numeral 6 having a shoulder designated 7.

This shoulder portion is adapted to receive a ferrule designated by the numeral 8, having a counterbore designated by the numeral 9 to fit substantially over the shoulder 7 of the handle 6. Into this handle member 6 is driven a stud designated by the numeral 40, the handle 6 being suitably drilled to have driven into it this stud 40. The stud 40 is provided with a conical piercing end designated by the numeral 11, its upper portion being suitably threaded in order to receive the remaining assembly of the scraper proper.

The threaded portion 12 of the stud 40 is adapted to receive slidably a locking nut designated by the numeral 14, having a bore designated by the numeral 15, and provided with engaging teeth designed by the numeral 16. The engaging teeth 16 of the nut 14 are adapted to mesh with the teeth 19 of the holding member designated by 17 which is preferably a block of metal or other suitable material, having a semicircular toothed section designated by the numeral 19, which toothed section is adapted to co-mesh and engage with the teeth 16 of the nut 14.

The holding member 17 is provided with a slotted portion designated by the numeral 18 which is wide enough to provide ample clearance for the threads 12 of the stud 40, and permit the same to swing radially about the threaded stud portion. The stud threads 12 are adapted to fit the pivot rod 21 which is suitably tapped in order to fit the threaded shank 12. The holding member 17 is provided with a reamed hole designated by the numeral 20 and is adapted to fit nicely and permit rotation of the stud 21 within the holder 17.

The top surface of the holding member 17 is threaded with two holes designated by the numeral 22 and is adapted to receive the extension of the handle member 29 and a cap screw designated by the numeral 23.

The scraper blade designated by the numeral 24 is provided with a cutting edge ground and honed to a suitable scraping angle designated by the numeral 15. This blade has a narrower portion at the rear designated by the numeral 37, and has a sharp cutting edge designated by the numeral 38.

The blade 24 is also provided with a slotted portion 26 which is open at one end and permits slipping the blade in and out of the assembly or the clamping head when it becomes necessary to hone it, or grind it, from time to time.

The blade is clamped on the holding head 17 by virtue of a clamping plate designated by the numeral 27, having an elongated slot designated by the numeral 28. The slot 28 is adapted to fit slidably the threaded shank 32, which is driven into the handle member 29 by means of a piercing point 33 at its opposite end, and the blade is definitely located for sliding movement by the body of the screw 23.

The handle portion designated at 29 is shaped as shown with a reduced shoulder, being reinforced by a ferrule designated by the numeral 30. The threaded stud 32 has its body 31 driven into a suitably drilled hole in the handle member 29.

The handle portion 6 which is integral with stud 40 is threaded into the pivot stud 21 as shown and the lock nut 13 is tightened after the adjusting nut 14 has been set, and its teeth 16 engaged with teeth 19 of the holding head designated by the numeral 17.

The blade is attached by slipping its opened or slotted portion 26 over the body of the screw 23 and the body of the threaded shank 31 which definitely locates it in place, and the clamping plate 27 is then brought to bear on the surface of the scraping blade 24 by locking the cap screw and the handle portion 29. The blade 24 may be set to extend as far beyond the edge of the clamping plate 27 or as close to it depending on the range, or degree of flexibility that is desired at the point 38 of the scraping blade.

It is readily obvious that the closer the blade edge is placed to the edge of the clamping plate 27 the more rigid and firmer the edge of the blade will be, whereas, the further the scraping edge is placed from the edge of the clamping plate 27 the more flexible the blade will be in use and operation.

The clamping plate for this reason is provided with an elongated slot designated by the numeral 28 in order to adapt it to be slidably adjusted, and thus provide a varied range of flexibility to the scraping blade 24.

In use or operation after the blade has been set to project the proper distance from the plate 27 the angularly adjustable head 17 is set to a convenient angle by loosening the nut 13 and disengaging the adjusting nut 14 then setting it to whatever angular relationship the operator desires it to be set. When the teeth 16 of the nut 14 are engaged with the teeth 19 they are locked in place by the lock nut designated by the numeral 13.

The blade is now ready for operation and the operator grasps the handle member 6 in one hand and the handle portion 29 in the other hand, and thus is enabled to apply more effective pressure to the scraping operation by using both hands.

Referring to Figure 4, I show a modification of my scraper arrangement wherein I provide the same angular adjusting head, and replace the handle member 29 with an additional locking or holding member designated by the numeral 23, so that a blade having two edges may be used in place of the one with a single edge shown and illustrated at 24.

In actual use the scraper edge of the blade often becomes dull and needs to be sharpened or honed, and it is advantageous at times to have for purposes of convenience a two edged blade similar to that shown at Figure 4.

The blade being designated by the numeral 35 has two holes drilled therein to adapt it to register with the threaded holes in the head 17, and the blade 35 is clamped in place by cap screws 23 and lock washers designated by the numeral 34.

The blade has two angular cutting surfaces designated by the numeral 36, providing the sharp scraping edges designated by the numeral 39. The blade may also be set at different scraping angles, depending on the adjustment of the adjusting nut 14 with respect to the adjusting head 17 as heretofore described.

In this modification one of the screws 23 and its lock washer 34 may be omitted if it is desired to use the scraper with both hands, and the handle member 29 may be used in its place.

I believe I have described in succinct terms and shown in the drawing preferred embodiments of my invention, so that those skilled in the art will be able to understand the novelty and objects of my invention and its particular features.

While I have shown preferred embodiments, it is readily obvious that my invention is susceptable of many modifications, changes, and alterations, and I reserve the right to all such changes, modifications and alterations, coming within the scope of my invention and the purview of the accompanying description and the appended claim.

Having thus described my invention what I claim as new and desire to secure by Letters Patent is:

A scraper instrument comprising, a main handle member having a threaded extension, a scraper support provided with teeth cut in radial formation and a central slotted portion adapted to straddle the threaded extension of the said handle member, said support swivellably attached to a pivot member provided with a threaded portion adapted to engage the threaded extension of the said handle member, an equalizer adjustment lock nut provided with teeth adapted to mesh with the teeth of said scraper support, a scraper blade provided with a slotted portion open at one end mounted on said scraper support, clamping means adapted to clamp the said scraper blade attached to said support, and an auxiliary handle member attached to said scraper support.

GUSTAV T. PETERSON.